E. E. ELLISON.
ROD COUPLING.
APPLICATION FILED JUNE 12, 1912.
1,047,014.
Patented Dec. 10, 1912.
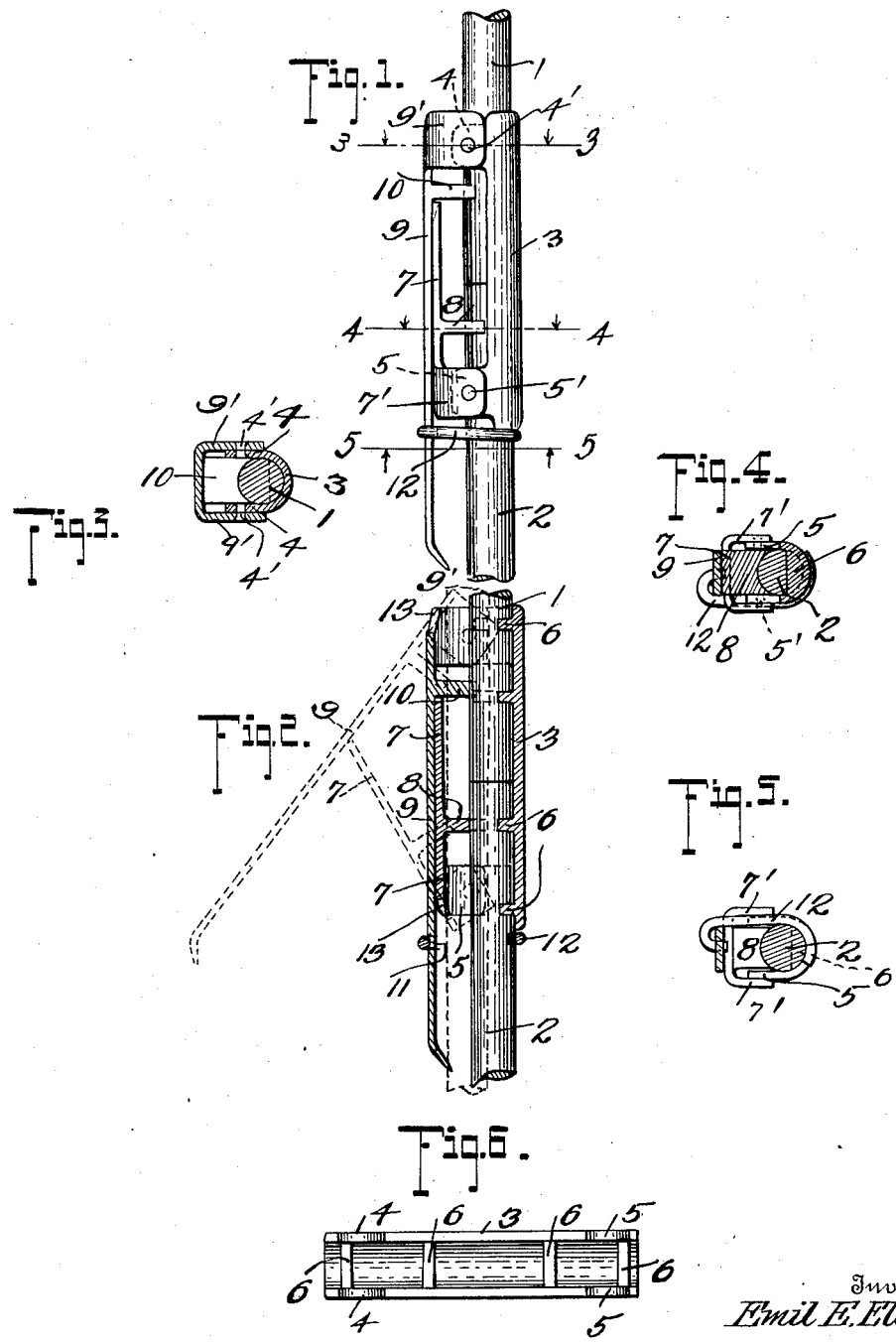
Witnesses
Inventor
Emil E. Ellison
By Robb & Robb
Attorneys

UNITED STATES PATENT OFFICE.

EMIL E. ELLISON, OF LITCHVILLE, NORTH DAKOTA.

ROD-COUPLING.

1,047,014. Specification of Letters Patent. Patented Dec. 10, 1912.

Application filed June 12, 1912. Serial No. 703,181.

*To all whom it may concern:*

Be it known that I, EMIL E. ELLISON, a citizen of the United States, residing at Litchville, in the county of Barnes and State of North Dakota, have invented certain new and useful Improvements in Rod-Couplings, of which the following is a specification.

The primary object of this invention is to provide a novel form of rod coupling of simple construction by means of which sections of rods may be quickly and easily connected. As is well known, the majority of devices of this nature in common use are threaded or require that the ends of the rod sections be threaded in order to properly adjust the coupling thereon, and having in view the difficulty which most often occurs in the event of breakage of rods, my aim has been to devise such a construction which will eliminate any need of threaded parts.

My invention, therefore, gives rise to numerous advantages, among which might be mentioned that rod sections may be quickly connected or coupled merely by the use of my device and the commonest of tools—a file. Where the sections to be coupled are employed for pump rods, repairs to a break of the rod may be accomplished without the necessity of removing said rod from the well. Most rods of this character are subject to very severe strain and where threaded couplings are used, the tendency is to weaken the rod at these points and this is entirely overcome by my invention.

All of the above objects and advantages of my invention will be more clearly understood by reference to the following description and the accompanying drawings, in which—

Figure 1 is a side elevation of a coupling constructed in accordance with my invention, and shown applied; Fig. 2 is a longitudinal section therethrough; Fig. 3 is a transverse section on the line 3—3 of Fig. 1; Fig. 4 is a similar section on the line 4—4 of Fig. 1; Fig. 5 is a transverse section on the line 5—5 of Fig. 1, looking upwardly; and Fig. 6 is a plan view of the coupling sleeve alone.

Throughout the following detail description and on the several figures of the drawings, similar parts are referred to by like reference characters.

Referring to the drawings and specifically describing the invention, 1 and 2 designate two sections of a rod which are to be connected, their ends abutting, though it will be understood that this last is not essential. The coupling proper consists of a sleeve 3 which is preferably of semicylindrical shape and formed on the edges near its opposite ends with pairs of spaced ears 4 and 5, both of the same having openings therethrough. The inner or concave surface of the coupling sleeve 3 is provided with a plurality of spaced transverse flanges or projections 6, the number of which is purely arbitrary, though I have in the drawing shown two for each end of the sleeve.

Pivoted on the pin 5' to the lower pair of ears 5 is a short clamping member 7 consisting of a plate having lateral ears 7' bent inwardly, as shown most clearly in Fig. 1. On the under side of the clamping member 7 and at a suitable point intermediate its length is provided a flange or projection 8, the inner edge portion of which is cut out or concave to conform to the shape of the rod.

At 9 is designated a second clamping member somewhat longer than that above described but similar in most respects thereto. The member 9 is pivoted at one end on the pin 4' to the spaced ears 4 on the sleeve, said member having corresponding ears 9' and the horizontally projecting flange 10, similar to the flange 8. The clamping member 9, when in its normal operative position, lies on top of the member 7 and at the lower portion of the same is provided an opening 11 into which one end of a stiff wire hook member 12 is secured, the opposite end of the securing member 12 being bent to conform partially to the shape of the rod and being open sufficiently to spring over the rod when pressed thereover into the position shown in Fig. 5. In this position the clamping members are held from displacement and the projections 8 and 10 are held in engagement with the rod sections.

From the foregoing it will be obvious that it is only necessary to provide the rod sections 1 and 2 with transverse grooves or notches corresponding to the flanges 6 and these may be made by a flat file, or otherwise. The flanges 8 and 10 of the clamping members 7 and 9 bear against the rod sections on the opposite side of the notches into which the flanges 6 are engaged and this construction greatly strengthens the rod at the point of connection of the several sections where usually it is weakest.

The uncoupling of the rod may be accomplished by disengaging the hook 12 from around the rod, thereby permitting the longer clamping member 9 to be raised upwardly, which in turn frees the other clamping member 7 so as to allow it to swing downwardly on its pivot, or in the opposite direction. This releases the pressure of the flanges 8 and 10 against the rod sections, which may then be disengaged from the flanges 6 and separated.

The clamping members, as most clearly shown in Fig. 2 of the drawings, are cut out slightly at their pivoted ends, designated 13, so that they may be moved outwardly on their pivots a sufficient distance to properly release the rod sections, as above described.

Such a device as hereinbefore described may be adapted to various purposes and slight changes may readily be made in the details of construction without departing from the spirit of my invention and within the scope of the claims hereto appended.

Having thus described the invention, what is claimed as new is:

1. In a rod coupling, the combination of a coupling sleeve having interlocking projections adapted to be positively engaged with rod sections, clamping members mounted on said sleeve for pivotal movement in opposite directions, one of said members being adapted to overlap the other, and a securing member movably carried by the overlapping member and engageable with a rod section to hold said members in the last mentioned position.

2. A rod coupling comprising a sleeve, flanges projecting from the inner portion thereof and adapted to be engaged with rod sections, a clamping member mounted at each end of the sleeve for pivotal movement in opposite directions, one of said clamping members being adapted to engage over the other, and a hook member connecting one of said clamping members with a rod section aforesaid.

3. In combination, a rod coupling comprising a semi-cylindrical sleeve, flanges projecting from the inner concave portion of the sleeve, rod sections having grooves therein to receive the flanges on said sleeve, a clamping member mounted at each end of the sleeve having flanges projecting therefrom to engage with the rod sections opposite the flanges of the sleeve, and a hook member connecting one of said clamping members with a rod section.

4. In combination, a rod coupling comprising a semi-cylindrical sleeve having spaced flanges projecting from the inner portion thereof and also provided with spaced ears at its opposite ends, rod sections having grooves corresponding to the spaced flanges aforesaid and into which the latter are received, a clamping member pivotally mounted on the ears at one end of the sleeve and having a flange projecting therefrom adapted to engage with one of the rod sections, a second clamping member pivotally mounted on the ears at the other end of the sleeve and adapted to engage over the first mentioned clamping member, said second clamping member having a flange projecting therefrom and adapted to engage with the other rod section, and a hook member secured to the second clamping member and adapted to engage over a rod section to thereby clamp the coupling in position to connect the rod sections together.

In testimony whereof I affix my signature in presence of two witnesses.

EMIL E. ELLISON.

Witnesses:
JOHN OLSON,
H. O. HANSON.

---

Copies of this patent may be obtained for five cents each, by addressing the "Commissioner of Patents, Washington, D. C."